United States Patent [19]
Lange

[11] 4,137,782
[45] Feb. 6, 1979

[54] APPARATUS FOR RETRACTING AND EXTENDING OF A LENS HOLDER OF A CAMERA

[75] Inventor: Karl-Heinz Lange, Bünde, Fed. Rep. of Germany

[73] Assignee: Balde Werke GmbH & Co. KG, Fed. Rep. of Germany

[21] Appl. No.: 806,359

[22] Filed: Jun. 14, 1977

[30] Foreign Application Priority Data

Jan. 29, 1977 [DE] Fed. Rep. of Germany ....... 2703667
Jan. 29, 1977 [DE] Fed. Rep. of Germany ....... 7702533

[51] Int. Cl.² ............................................. F16H 19/04
[52] U.S. Cl. ......................................... 74/32; 354/195; 350/187
[58] Field of Search ...................... 74/25, 32, 435, 436, 74/437; 350/187, 255; 354/195, 197; 155/55, 56

[56] References Cited

U.S. PATENT DOCUMENTS

| | | | |
|---|---|---|---|
| 2,995,061 | 8/1961 | Briskin et al. | 350/187 |
| 3,251,285 | 5/1966 | Uterhart | 354/195 |
| 3,398,666 | 8/1968 | Mamiya et al. | 354/195 |
| 4,021,115 | 5/1977 | Jeppesen | 355/56 |
| 4,040,070 | 8/1977 | Hinon et al. | 354/195 |

*Primary Examiner*—Robert A. Hafer
*Attorney, Agent, or Firm*—Jacobs & Jacobs

[57] ABSTRACT

Apparatus for the retracting and extending the lens holder of a camera, which comprises two gear wheels or gearwheel segments swingably supported about fixed axes on different sides of the longitudinal central plane of the lens holder, said gear wheels or gear-wheel segments being in direct or indirect engagement with each other, two stationary toothed members, two swingable segments coupling said lens holder and said gear wheels or gear-wheel segments, said gear wheels or gear-wheel segments, when swung, being operable to retract and extend said lens holder via said swingable segments and to move said swingable segments over the toothed segments as said lens holder is extended from its fully retracted position, such that with equal paths of swing of the gear wheels or gear-wheel segments, the lens holder is displaced by a larger amount in the vicinity of the retracted position than in the vicinity of the extended position.

11 Claims, 5 Drawing Figures

APPARATUS FOR RETRACTING AND EXTENDING OF A LENS HOLDER OF A CAMERA

The present invention relates to an apparatus for the retracting and extending of the lens holder of a camera.

Such extending and retracting devices are known and are formed in many varied ways. In one known device of this type, as described in German Pat. No. 643,094, a focusing wheel turnable about a vertical axis is arranged on the top of the camera housing. The focusing wheel is provided on its bottom side with a similarly supported disk having a spirally arranged guide groove. A guide pin engages into the spirally arranged guide groove, said pin being fixed on the top of the lens housing. Upon the turning of the focussing wheel, and thus upon the turning of the spiral disk, the lens housing moves into the retracted or extended position depending on the direction of rotation. The spiral groove is provided at its inner part with a large slope in order to be able to bring the lens into the infinity position as rapidly as possible, while the closing-up focusing of the lens is equivalent to a fine focusing as a result of the small slope of the spiral groove at the circumference.

One essential disadvantage of the known device is that the solution, which is based on the principle of an oblique plane, has a relatively large amount of play. This is disadvantageous if the focusing knob is also used to actuate a range finder coupled with the focusing knob.

An object of the present invention is so to provide a device of the aforementioned type that it has as little play as possible.

Another object of the invention is to provide such a device that will reliably guide the lens in every position of extension thereof.

A further object of the invention is to provide such a device that is as compact as possible and thus be suitable, in particular, for use in small cameras.

These and other objects are fulfilled by the lens holder retracting and extending device of the present invention which comprises two gears or gear segments which are swingably supported around stationary axes on different sides of the longitudinal central plane of the lens holder and which engage indirectly or directly with each other, said gears or gear segments driving swingable segments which move on two stationary toothings, the segments in their turn being engaged with the lens holder in such a manner that, for equal swinging paths of the gears or gear segments, the lens holder is displaced by a larger amount in the vicinity of the retracted position than in the vicinity of the extended position.

It is preferred to prevent the lens holder from rotating around the optical axis of the lens by means of longitudinal guide elements. The longitudinal guide elements preferably consist of a pin and a groove, slot, or the like, the one longitudinal guide element being arranged on the lens holder while the other is secured to the housing.

In accordance with another embodiment of the invention, the segments which are pivoted to the gear segments are in engagement with the stationary toothing during the first phase of movement upon the extending of the lens holder and travel in this connection via guide pins or the like in a guide groove which extends transverse to the longitudinal central plane of the lens holder. In this connection, after the guide pins come against a stop, the toothing of the segments comes out of engagement with the stationary toothing and, upon further extension, the guide pins move over a guide surface which extends parallel to the longitudinal central plane.

It has been found desirable for the pairs of gear segments, the segments, the stationary toothing, and the guide elements for the segments to be provided in duplicate, on opposite sides of the lens holder.

In a preferred embodiment of the invention, the gear segments can be driven by a manually turnable drive gear.

The device in accordance with the invention can be built without play, particularly if the gears and gear segments used are produced by injection molding from a plastic material having some elasticity. In this way, if the gear wheels and gear-wheel segments are slightly oversized, the corresponding parts when installed rest with tension against each other.

In a preferred embodiment, the drive gear wheel has a spiral focusing curve which swings a mirror, forming part of a range finder, as a function of the turned position of the drive gear wheel, a distance scale being rigidly coupled with the drive gear-wheel.

In accordance with a further embodiment of the invention, the pitch diameter of the stationary toothing is twice as great as the pitch radius of the segment, the pitch radius of the segment extending through the axis of swing of the gear segment and the segment engaging into a borehole in the lens holder by means of a pin whose axis lies on the pitch circle of the segment.

It has been found desirable to arrange the pitch circle of the stationary toothing concentric to the pitch circle of the toothing of the gear segment.

The aforementioned embodiment has the advantage that a continuous course of the extension movement is assured from the retracted position to the fully extended position. At the start of the extending process there is a rapid movement, while towards the end thereof, and therefore in the region of the distance focusing, there is a slow displacement of the lens holder. Such an embodiment can be developed with rotating individual parts and does not require individual guide curves. The gearwheel regions which mesh with each other remain at all times in engagement during the entire process of extension.

Several preferred embodiments of the invention will be described in detail below with reference to the accompanying drawings, in which.

Figure 1:
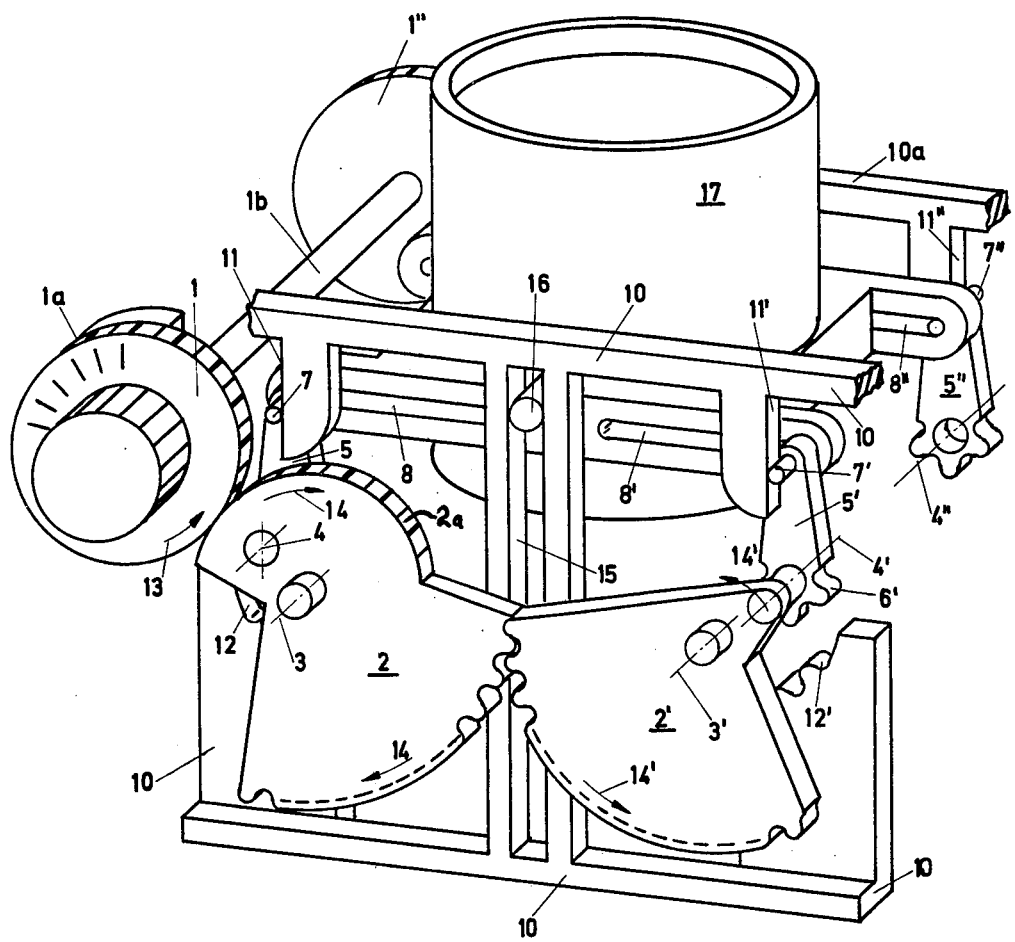
FIG. 1 is a perspective view of a first embodiment of the invention, seen in the fully extended position of the lens.
Figure 2:
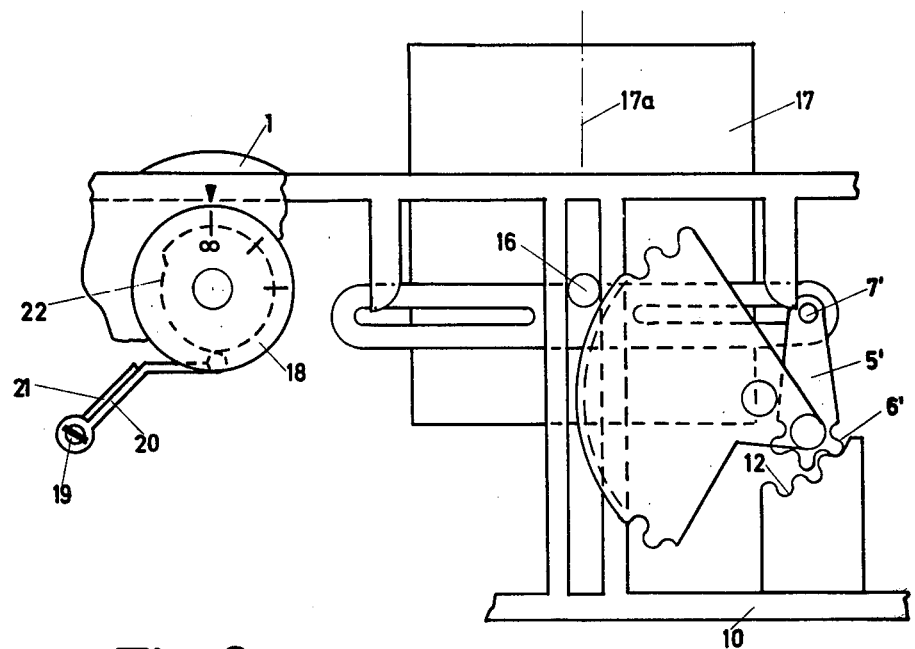
FIG. 2 is a top view of a part of the embodiment shown in FIG. 1, seen in a position of medium extension of the lens.
Figure 3:
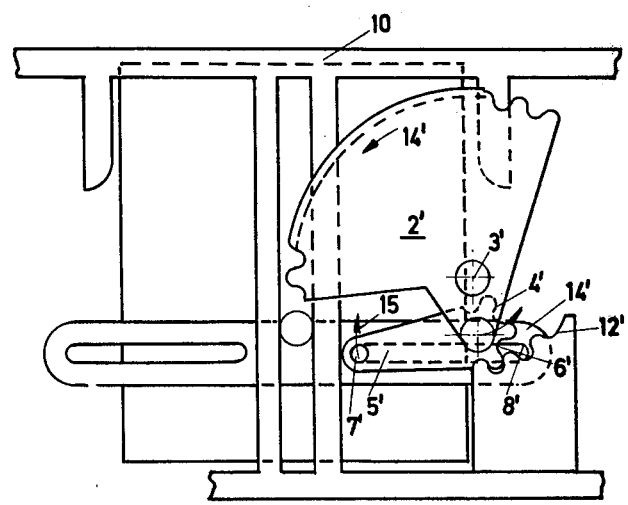
FIG. 3 shows a part of the device of FIGS. 1 and 2 in the retracted position of the lens.

Referring to the embodiment shown in FIGS. 1 to 3, a longitudinal groove 15 extending in the direction of the longitudinal axis 17a of the lens is provided in the part 10 which is fixed to the camera housing, and a guide pin 16 which is rigidly connected with the lens housing 17 travels in said groove. The region which is fixed to the camera housing has two guide surfaces 11 and 11', parallel to the groove 15, on both sides of said groove.

A drive gear 1 engages, via an outer toothing 1a, the toothing 2a of a gear segment 2. The gear segment 2 is swingably supported around an axis 3 which is fixed in space. A segment 5 is swingably pivoted around the shaft 4 on the gear segment 2. The segment 5 has a gear-wheel region 6 (not shown in the drawings) which in the first extended position meshes with a fixed toothing 12. A similar segment 2' is in engagement with the gear segment 2 and is supported swingably around a shaft 3' which is fixed in space. A segment 5' is also swingably supported about a shaft 4' on the second gear segment 2'. The toothing 6' of the segment 5' is in engagement, during the first phase of extension, with the stationary toothing 12'. The segments 5 and 5' have guide pins 7 and 7' which on their bottom (not visible in FIG. 1) extend into guide slots 8 and 8'. The guide slots 8 and 8' are arranged, transverse to the lens axis 17a, on the lens holder 17.

A drive gear wheel 1'' is rigidly connected via a shaft 1b with the drive gear-wheel 1. The gear wheel 1'' meshes with the toothing of another gear-wheel segment on the bottom of the lens. A gear and gear segment arrangement similar to that on the top of the lens is provided also on the bottom of the lens. In FIG. 1 the corresponding parts have been provided with corresponding numbers plus a double prime mark. The stationary part 10a on the bottom of the lens corresponds to the stationary part 10.

The toothings 6 and 6' are in engagement with stationary arcuate toothings 12 and 12' respectively in the first phase of movement, namely in the retracted position of the lens holder 17. Upon the extending of the lens holder, the drive gear 1 is turned in the direction indicated by the arrow 13 (cf. on basis of FIG. 3). In this way, the movement of the toothing 1a of the drive wheel 1 is transmitted to the toothing 2a of the gear-wheel segment 2 which turns in the direction indicated by the arrow 14. As a result, the shaft 4 swings in the direction indicated by the arrow 14 around the stationary axis 3. At the same time, the toothing of the segment 5 moves over the stationary toothing 12. The above movements correspond identically to the movements of the corresponding structural parts which are provided on the right hand side of FIG. 1 and are indicated by a prime or double prime mark. For easier understanding of the drawing, the description will be continued on basis of FIGS. 2 and 3.

The guide pin 7, upon swinging in the direction of the arrow 15 (FIG. 3), passes along the guide groove 8 until it has arrived at the end thereof. Upon the further turning of the gear segment 2, the gear-wheel region 6' is now brought out of engagement with the stationary toothing 12'. The guide pin 7' then moves linearly along the guide surface 11' (FIG. 2). As soon as the toothing 6' has come out of the stationary toothing 12', the extending of the lens holder 17 takes place with a substantially slower speed than during the first stage of movement in which the toothing 6' was in engagement with the stationary toothing 12'.

Upon the retraction of the lens holder the movements described take place in the reverse sequence.

By the doubling of the displacement members described, a dependable guiding of the lens holder is obtained on both sides. A further improvement in the guiding properties is obtained by providing displacement members, such as described above, also on the bottom of the lens. The guiding of the lens holder 17 thus takes place at four diametrically opposite guide points which are formed by the four guide pins 7, 7', 7'' and 7'''.

In FIG. 2, the cooperation of the drive gear wheel 1 with the distance focusing is furthermore shown. The drive gear wheel 1 serves at the same time as distance-focusing wheel. The scale 18 which is rigidly connected with the drive gear wheel 1 turns by the same amount as the drive gear wheel 1.

A spiral focusing cam 22 is provided on the drive gear wheel 1. The end of a mirror holder 20 bearing a mirror 21 rests against the spiral focusing cam 22. The mirror holder 20 is swingable about the axis 19. The mirror 21 forms a part of a range finder, the rest of which is not shown.

Figure 4:
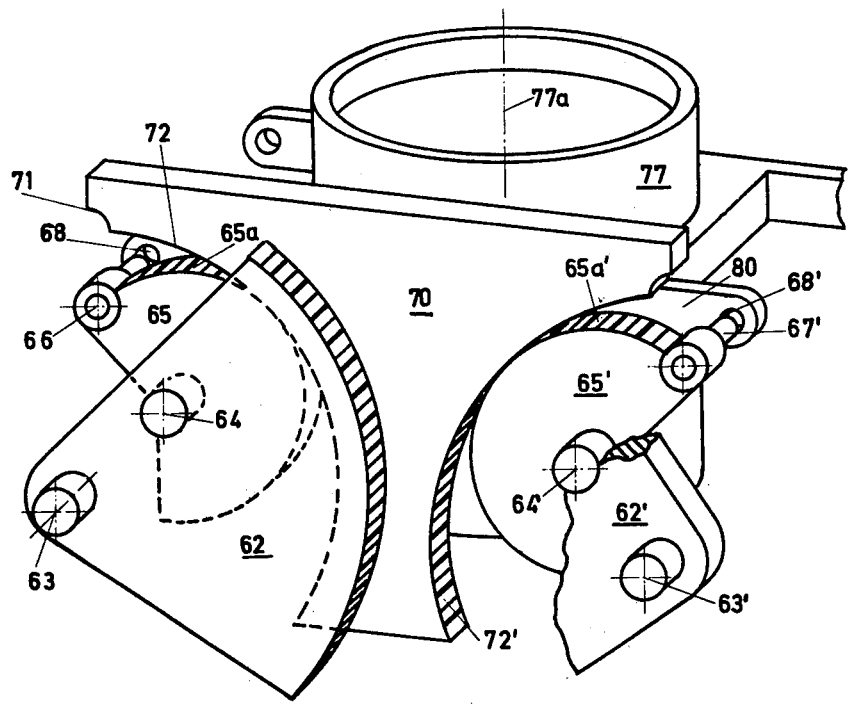
FIG. 4 is a perspective view of a second embodiment of the invention, seen in a half-extended position of the lens.
Figure 5:
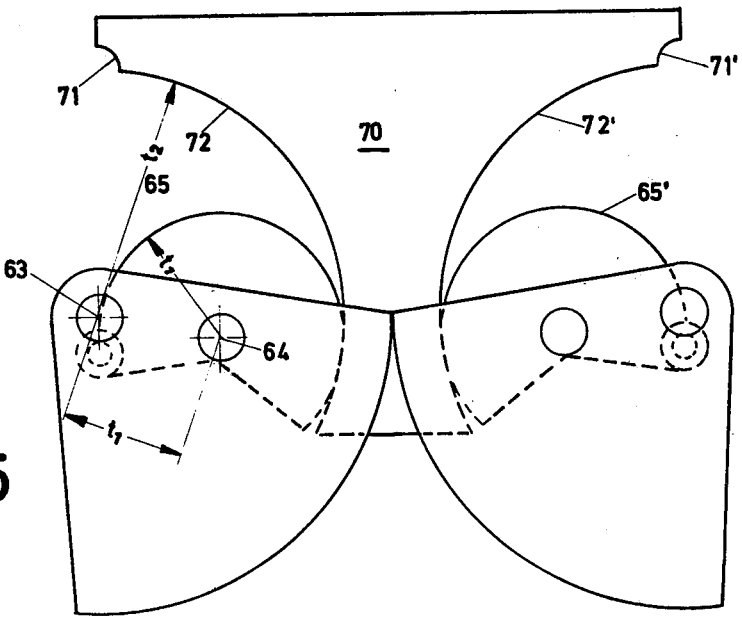
FIG. 5 is a top view of the embodiment of FIG. 4, shown in the retracted position of the lens.

Referring to the embodiment shown in FIGS. 4 and 5, the drive gear wheel which drives the gear-wheel segment 62 is not shown. The gear-wheel segment 62' has been shown only in part, in order not to clutter the drawing.

The gear-wheel segment 62 is swingable about a fixed axis 63. A segment 65 is swingable about a shaft 64 on the gear-wheel segment 62. The segment 65 has a toothing 65a which meshes with a toothing 72, which is fixed in space. The pitch radius $t_1$ corresponds to the distance between the axes 63 and 64. The pitch radius $t_1$ is precisely half as large as the pitch radius $t_2$ of the stationary toothing 72 which is located on the stationary camera part 70.

A pin 67 is arranged in such a manner that its axis 66 passes through the pitch circle of the toothing 65a having the pitch radius $t_1$. The pin 67 engages into a bore hole 68 in the lens holder 77. The pin 67 and the borehole 68 are shown out of engagement with each other for the sake of clarity in FIG. 4.

On the right-hand side of FIGS. 4 and 5, the parts described above are also provided. They bear the same reference numbers, provided however with a prime mark. The lens holer 77 has arms 80 in which the receiving boreholes 68 for the pins 67 are provided. The drive device shown on the top of the lens is provided in the same manner on the bottom of the lens. In this embodiment also, the guiding of the lens holder is provided at four diametrically opposite points, which are formed by the pins 67 or 67' and the boreholes 68 and 68', respectively.

In the last mentioned embodiment, no device to prevent undesired rotation of the lens around the lens axis 67a is required.

If the pitch radii $t_1$ and $t_2$ are not in a ratio of 1 to 2, the movement of the pins 67, 67' is no longer linear or parallel to the lens axis 67a. In this case, a transverse slot is requied on the lens holder, as provided in the embodiment shown in FIGS. 1 and 2. This transverse slot can then take up the transverse movement of the pin.

What is claimed is:

1. Apparatus for the retracting and extending the lens holder of a camera, which comprises two gear means swingably supported about fixed axes on different sides of the longitudinal central plane of the lens holder, said gear means each comprising at least a segment of a gear-wheel, said gear means being operatively associated with each other, two stationary toothed members, two swingable segments coupling said lens holder and said gear means and having toothing operable to intermesh with stationary toothing, said gear means, when swung, being operable to retract and extend said lens holder via said swingable segments and to move said swingable segments over the stationary toothed members as said lens holder is extended from its fully retracted position, such that with equal paths of swing of the gear means, the lens holder is displaced by a larger amount in the vicinity of the retracted position than in the vicinity of the extended position.

2. Apparatus according to claim 1, wherein guide means is provided for said lens holder to prevent rotation of said lens holder around the optical axis of the lens during retraction and extension of said lens holder.

3. Apparatus according to claim 2, wherein said guide means comprises a longitudinally extending groove or slot and a pin in said groove or slot, one being arranged on the lens holder and the other being secured rigidly to the camera housing.

4. Apparatus according to claim 1, wherein said lens holder has a groove extending transversely to the longitudinal central plane of said lens holder and said camera housing has a stop surface and a guide surface parallel to the longitudinal central plane, said swingable segments being pivoted to said swingable gear means and having a guide pin mounted for movement within said groove and toothing mating with the stationary toothed member, said swingable segments being operable, during extension of said lens holder, to first pivot with its toothing in engagement with the stationary toothed member until the guide pin abuts said stop, then to move out of engagement with the stationary toothing, and then, upon further extension, to move with the guide pins traveling along the guide surface.

5. Apparatus according to claim 4, wherein the gear means, the swingable segments, the stationary toothed member and the guide elements for the swingable segments are in each case provided in duplicate sets on different sides of the lens holder.

6. Apparatus according to claim 1, wherein the gear means are adapted to be driven by a manually turnable drive gear wheel.

7. Apparatus according to claim 6, wherein the drive gear wheel has a spiral focusing cam for swinging a mirror forming part of a range finder as a function of the position to which the drive gear wheel has been turned, a distance scale being rigidly coupled with the drive gear wheel.

8. Apparatus according to claim 1, in which said stationary toothed member and said swingable segments have intermeshing circular toothing, the pitch radius of the toothing on the stationary toothed member being twice the pitch radius of the toothing of the swingable segment, the pitch radius of the swingable segment passing through the axis of swing of the gear means and the swingable segment having a pin whose axis lies on its pitch circle and that is engaged in a borehole in the lens holder.

9. Apparatus according to claim 8, wherein the pitch circle of the stationary toothing is arranged concentrically to the pitch circle of the toothing of the gear means.

10. Apparatus according to claim 1, wherein said gear means is a gear wheel.

11. Apparatus according to claim 1, wherein said gear means is a gear wheel segment.

* * * * *